Patented June 4, 1935

2,003,429

UNITED STATES PATENT OFFICE 2,003,429

LIQUID COMPOSITION

Henry L. Cox, South Charleston, W. Va., assignor to Carbide and Carbon Chemicals Corporation, a corporation of New York No Drawing. Application October 17, 1931, Serial No. 569,541

5 Claims. (Cl. 252—5)

This invention relates to fluid mixtures which freeze only at very low temperatures and which are useful as heat and pressure transferring media and the like.

Fluids used for heat transfer, for example in the cooling systems of internal combustion engines, are frequently called upon to operate over a wide temperature range, and it is desirable that they do not vaporize rapidly or change in composition at the higher nor solidify at the lower temperatures of the operating range. In the cooling systems of aircraft engines the conditions are particularly severe, inasmuch as fuel efficiency and heat transfer efficiency are improved when the temperature of the engine and cooling fluid are raised; the cooling fluid must withstand high temperatures and yet not solidify at temperatures which are well below the freezing point of water.

Low-freezing fluids are desirable also as pressure transferring media, used for example in shock absorbers, fluid-pressure lifts, gun-recoil mechanisms and the like.

For these purposes it has been customary to use mixtures of water with monohydroxy and polyhydroxy alcohols such as methanol, ethanol, the glycols and glycerol, or a single substantially anhydrous high-boiling alcohol such as ethylene glycol or diethylene glycol. The aqueous mixtures, while they freeze only at temperatures below the freezing point of water, suffer from a number of disadvantageous characteristics which make them unsuitable for use above moderate temperatures: they are characterized by a low flash point, high vapor pressure, and a tendency for unequal rates of evaporation of the components which results in a progressive change in composition, and this change in turn results in the raising of the freezing point of the mixture. The glycols, used singly, are not as objectionable in these respects, but are characterized by a freezing-temperature which is not far from that of water.

It is the principal object of my invention to provide a number of fluid mixtures which possess the valuable characteristics that they solidify only at extremely low temperatures, below —50° C., have low vapor pressures relative to and markedly higher boiling points than water and when vaporized change very slowly in composition.

I have discovered that the objects of my invention may be secured by the use of substantially anhydrous mixtures of polyhydric alcohols, preferably having boiling points separated by less than about 20° C. For example, substantially anhydrous mixtures comprising ethylene glycol and propylene glycol, or diethylene glycol and dipropylene glycol, or triethylene glycol and glycerol have boiling points less than 20° C. apart, change in composition only slowly on evaporation, boil considerably above the boiling point of water, and have very low freezing points. Mixtures composed of roughly equal volumes of each component will not solidify at temperatures as high as —50° C., and do not tend to change rapidly in composition upon evaporation, as shown by the fact that the components cannot be readily separated by ordinary fractional distillation.

The flash points of all of these polyhydric alcohol mixtures are high, which is of great advantage when the fluid is to be used as a coolant for aircraft engines. The following table shows the boiling points and flash points of the components of several typical mixtures, and also the flash points of the mixtures when composed of about equal portions of each constituent. The boiling point of each mixture is intermediate between the boiling points of the constituents of that mixture.

| Mixture | Boiling point of single alcohol | Flash point of single alcohol | Flash point of mixture |
|---|---|---|---|
| Ethylene glycol | 195° C. | 116° C. | } 104° C. |
| Propylene glycol | 187° C. | 99° C. | |
| Diethylene glycol | 245° C. | 141° C. | } 123° C. |
| Dipropylene glycol | 230° C. | 117° C. | |
| Triethylene glycol | 290° C. | 166° C. | } 170° C. |
| Glycerol | 291° C. | 174° C. | |

It will be obvious that other mixtures of any two or more polyhydroxy alcohols may be used for certain purposes. Such mixtures will possess low freezing points and high boiling points equal to or higher than the boiling point of the lowest boiling component. Where the vaporizing characteristics of the mixture are not of great importance, as for example in shock absorbers and the like, any of the anhydrous mixtures of the polyhydroxy alcohols are useful. It is evident therefore that I should not be limited by or to the specific examples used herein, but should be limited only to the principle of my invention as disclosed in this specification and defined in the appended claims.

I claim:

1. Medium for transferring heat or pressure consisting of a substantially anhydrous mixture of at least two polyhydric alcohols which freezes at a temperature below about —50° C., the boiling points of the individual alcohols being separated by less than about 20° C.

2. Liquid composition for transferring heat or pressure consisting of a substantially anhydrous mixture of at least two polyhydric alcohols which freezes at a temperature below about —50° C. and boils above about 180° C., the boiling points of the individual alcohols being separated by less than about 20° C.

3. Heat transfer medium which consists of a substantially anhydrous mixture in approximately equal proportions of ethylene glycol and propylene glycol.

4. Heat transfer medium which consists of a substantially anhydrous mixture in approximately equal proportions of diethylene glycol and dipropylene glycol.

5. Heat transfer medium which consists of a substantially anhydrous mixture in approximately equal proportions of triethylene glycol and glycerol.

HENRY L. COX.